US011991790B2

(12) United States Patent
Ikeno

(10) Patent No.: US 11,991,790 B2
(45) Date of Patent: May 21, 2024

(54) FUSER

(71) Applicant: Brother Kogyo Kabushiki Kaisha, Nagoya (JP)

(72) Inventor: Yuichi Ikeno, Maibara (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 302 days.

(21) Appl. No.: 17/159,305

(22) Filed: Jan. 27, 2021

(65) Prior Publication Data

US 2021/0235547 A1 Jul. 29, 2021

(30) Foreign Application Priority Data

Jan. 29, 2020 (JP) ................................ 2020-012665

(51) Int. Cl.
*H05B 1/02* (2006.01)
*H05B 3/26* (2006.01)

(52) U.S. Cl.
CPC ............ *H05B 1/0241* (2013.01); *H05B 3/26* (2013.01)

(58) Field of Classification Search
CPC ................................ H05B 1/0241; H05B 3/26
See application file for complete search history.

(56) References Cited

U.S. PATENT DOCUMENTS 6,455,811 B2 * 9/2002 Otsuka .............. G03G 15/2053 432/60
10,481,536 B2 * 11/2019 Fujita ..................... G03G 15/55
2015/0277309 A1 10/2015 Kuroda
2016/0161891 A1 6/2016 Tanto
2016/0170351 A1 6/2016 Suzuki et al.
(Continued)

FOREIGN PATENT DOCUMENTS

JP 2001-125408 A 5/2001
JP 2001-356623 A 12/2001
JP 2002-075595 A 3/2002
(Continued)

OTHER PUBLICATIONS

Japanese Office Action (with English translation) dated Oct. 17, 2023 (Application No. 2020-012665).
(Continued)

*Primary Examiner* — Dana Ross
*Assistant Examiner* — Joe E Mills, Jr.
(74) *Attorney, Agent, or Firm* — BURR PATENT LAW, PLLC

(57) ABSTRACT

A fuser, having a heater in a form of a planar plate and a holder supporting the heater, is provided. The heater has a first face and a second face opposite to the first face. The holder has a supporting base supporting the first face of the heater, a side wall protruding from the supporting base, a first contact portion, and a second contact portion. The first contact portion is located in an end area on one side in a lengthwise direction of the holder. The first contact portion protrudes from the side wall and contacts the second face of the heater. The second contact portion is located apart from the first contact portion in the lengthwise direction in an end area on the other side of the holder in the lengthwise direction. The second contact portion protrudes from the side wall and contacts the second face of the heater.

13 Claims, 7 Drawing Sheets

(56) References Cited

U.S. PATENT DOCUMENTS

2019/0286028 A1 9/2019 Furuichi et al.

FOREIGN PATENT DOCUMENTS

| | | | |
|---|---|---|---|
| JP | 2010-060796 | A | 3/2010 |
| JP | 2011-145455 | A | 7/2011 |
| JP | 2015-191734 | A | 11/2015 |
| JP | 2016-110096 | A | 6/2016 |
| JP | 2016-114619 | A | 6/2016 |
| JP | 2019-020651 | A | 2/2019 |
| JP | 2019-164996 | A | 9/2019 |
| JP | 2020-197674 | A | 12/2020 |

OTHER PUBLICATIONS

Japanese Notice of Reasons for Refusal(with English translation), Japanese Application No. 2020-012665, dated Feb. 27, 2024 (8 pages).

* cited by examiner

FUSER

CROSS REFERENCE TO RELATED APPLICATION

This application claims priority from Japanese Patent Application No. 2020-012665, filed on Jan. 29, 2020, the entire subject matter of which is incorporated herein by reference.

BACKGROUND

Technical Field

An aspect of the present disclosure is related to a fuser having a heater.

Related Art

A fuser having a heater in a form of a planar plate is known. The heater may be attached to a holder by a connector and a clip. For example, the connector may nip the heater and the holder at an end area of the heater on one side in a lengthwise direction, and the clip may nip the heater and the holder at an end area of the heater on the other side in the lengthwise direction.

SUMMARY

In order to attach the heater onto the holder through the connector and the clip, a worker may attach the connector onto the end area of the holder on the one side and thereafter the clip onto the end area of the holder on the other side one after another, which may be bothersome to the worker.

The present disclosure is advantageous in that a fuser, in which a heater may be easily attachable to a holder, is provided.

According to an aspect of the present disclosure, a fuser, having a heater in a form of a planar plate and a holder supporting the heater, is provided. The heater has a first face and a second face opposite to the first face. The holder has a supporting base supporting the first face of the heater, a side wall protruding from the supporting base, a first contact portion, and a second contact portion. The first contact portion is located in an end area on one side in a lengthwise direction of the holder. The first contact portion protrudes from the side wall and contacts the second face of the heater. The second contact portion is located apart from the first contact portion in the lengthwise direction in an end area on the other side of the holder in the lengthwise direction. The second contact portion protrudes from the side wall and contacts the second face of the heater.

According to another aspect of the present disclosure, a fuser, having a heater in a form of a planar plate, a holder supporting the heater, and a fastening member configured to fasten the heater to the holder, is provided. The heater has a first face and a second face opposite to the first face. The holder has a supporting base supporting the first face of the heater, a side wall protruding from the supporting base, and a contact portion located apart from the fastening member in a lengthwise direction of the heater. The contact portion protrudes from the side wall and contacts the second face of the heater.

BRIEF DESCRIPTION OF THE ACCOMPANYING DRAWINGS

DETAILED DESCRIPTION

Figure 1:
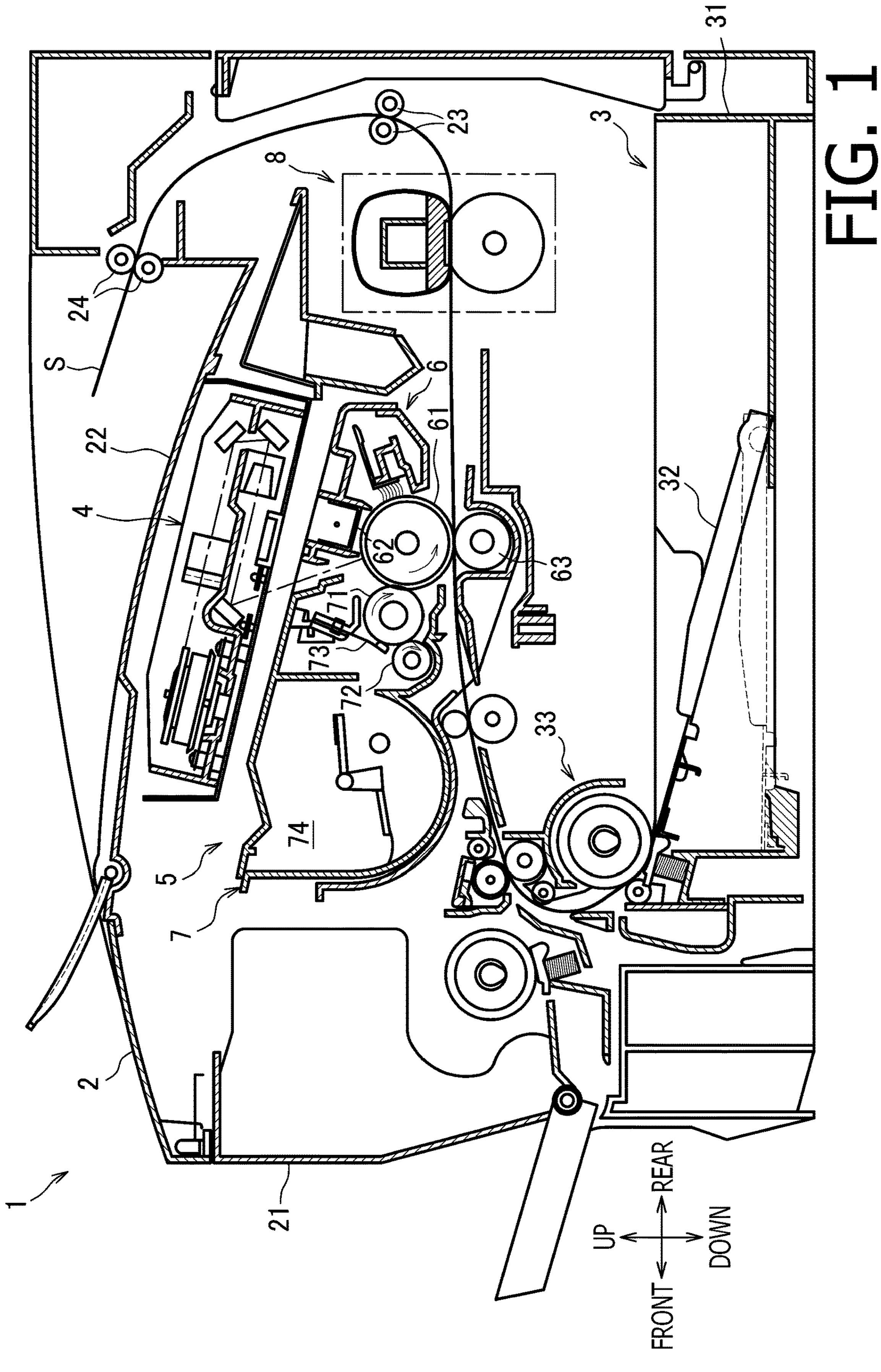
FIG. 1 is an illustrative cross-sectional view of a laser printer with a fuser according to an embodiment of the present disclosure.

Hereinafter, an embodiment of the present disclosure will be described with reference to the accompanying drawings. As shown in FIG. 1, a laser printer 1 includes a feeder 3, an exposure device 4, a process cartridge 5, and a fuser 8, which are stowed in a casing 2.

The feeder 3 is located at a lower position in the casing 2 and includes a feeder tray 31, a lifting plate 32, and a feeder device 33. The feeder tray 31 may store sheets S therein. The sheets S may be lifted upward by the lifting plate 32 and fed to the process cartridge 5 by the feeder device 33.

The exposure device 4 is located at an upper position in the casing 2 and includes a light source, which is not shown, and polygon mirrors, lenses, and reflective mirrors, which are shown but not signed in the drawings. In the exposure device 4, the light source may emit a laser beam to scan a surface of a photosensitive drum selectively based on image data to expose the surface of the photosensitive drum 61.

The process cartridge 5 is located at a lower position with respect to the exposure device 4 and is detachable from the casing 2 through an opening, which is exposed when a front cover 21 on the casing 2 is open. The process cartridge 5 includes a drum unit 6 and a developing unit 7. The drum unit 6 includes the photosensitive drum 61, a charger 62, and a transfer roller 63. The developing unit 7 is detachable from the drum unit 6 and includes a developing roller 71, a supplier roller 72, a flattening blade 73, and a container 74 to contain a toner.

In the process cartridge 5, the surface of the photosensitive drum 61 may be charged evenly by the charger 62 and exposed to the laser beam from the light source in the exposure device 4. Thereby, an electrostatic latent image based on the image data may be formed on the photosensitive drum 61. Meanwhile, the toner in the container 74 may be supplied to the developing roller 71 through the supplier roller 72 and enter a position between the developing roller 71 and the flattening blade 73. The toner may be flattened evenly by the flattening blade 73 to form an evenly flattened layer on the developing roller 71. The toner may be thereafter supplied from the developing roller 71 to the electrostatic latent image formed on the photosensitive drum 61. Thus, the electrostatic latent image may be developed to form a visible toner image on the photosensitive drum 61. As the sheet S is conveyed through a position between the photosensitive drum 61 and the transfer roller 63, the toner image on the photosensitive drum 61 may be transferred onto the sheet S.

The fuser 8 is located at a position downstream from the process cartridge 5 in a conveying direction, in which the sheet S is conveyed. The sheet S with the toner image transferred thereon may be conveyed through the fuser 8 to have the toner image fixed thereon by fusing. The sheet S with the toner image fused thereon may be ejected outside the casing 2 by conveyer rollers 23, 24 to rest on an ejection tray 22.

Figure 2:
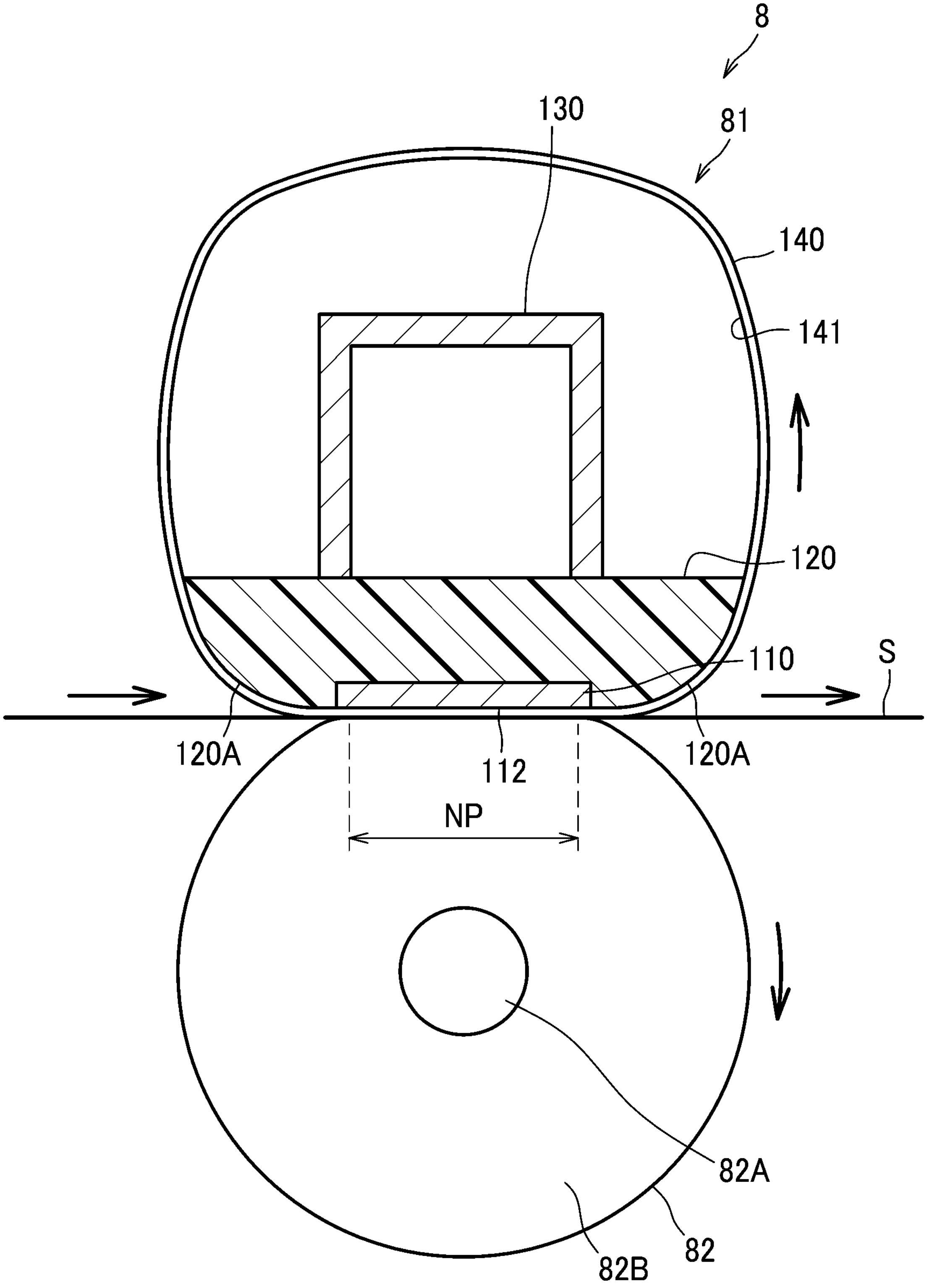
FIG. 2 is an illustrative cross-sectional view of the fuser according to the embodiment of the present disclosure.

As shown in FIG. 2, the fuser 8 includes a heater unit 81 and a pressure roller 82. One of the heater unit 81 and the pressure roller 82 may be urged against the other by an urging mechanism, which is not shown.

The heater unit 81 includes a heater 110, a holder 120, a stay 130, and a belt 140. The heater 110 may be of a planar plate shape and is supported by the holder 120. The heater 110 will be described further below in detail.

The holder 120 may be made of, for example, resin. The holder 120 has a guide face 120A, which may contact an inner circumferential surface 141 of the belt 140 and guide the belt 140. The stay 130 supports the holder 120 and may be formed by folding a plate having greater rigidity than the holder 120, e.g., a steel plate, into an approximate shape of U in cross section.

The belt 140 is an endless belt having heat-tolerance properties and flexibility and includes a base tube made of metal such as stainless steel and a fluorine resin layer coating the metal base tube. The heater 110, the holder 120, and the stay 130 are arranged inside the belt 140. The belt 140 is arranged to rotate around the heater 110, the holder 120, and the stay 130.

The pressure roller 82 includes a shaft 82A made of metal and an elastic layer 82 coating the shaft 82A. The pressure roller 82 forms a nipping portion NP, in which the belt 140 is nipped between the heater 110 and the pressure roller 82 to apply heat and pressure to the sheet S.

The pressure roller 82 may be driven by a driving force transmitted from a motor, which is not shown but is located inside the casing 2, to rotate. As the pressure roller 82 rotates, a friction force produced between the pressure roller 82 and the belt 140 or the sheet S may cause the belt 140 to rotate passively. Thus, the transferred toner image may be thermally fixed to the sheet S as the sheet S is conveyed between the pressure roller 82 and the heated belt 140.

Figures 3A, 3B:
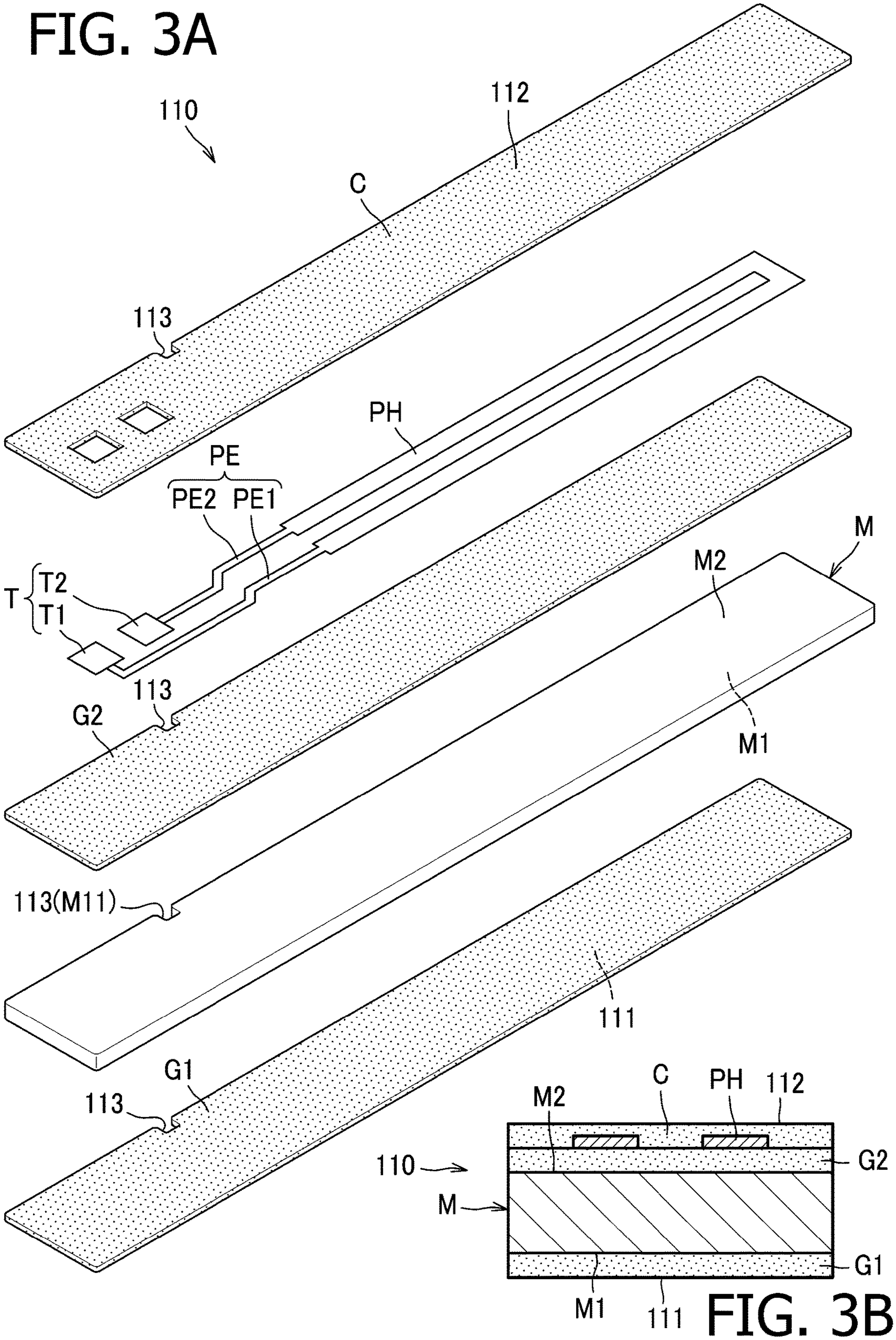
FIGS. 3A and 3B are an exploded view and a cross-sectional view, respectively, of a heater in the fuser according to the embodiment of the present disclosure.

As shown in FIGS. 3A-3B, the heater 110 is an elongated planar plate and has a first face 111 and a second face 112, which spread orthogonally to an urging direction, in which one of the heater unit 81 and the pressure roller 82 is urged against the other.

In the following description, a direction of longer sides of the heater 110 may be called as a lengthwise direction, and a direction of shorter sides of the heater 110 may be called as a widthwise direction. The lengthwise direction of the heater 110 coincides with a direction of a rotation axis of the pressure roller 82, in other words, a direction, in which the shaft 82A extends. The widthwise direction of the heater 110 coincides with the conveying direction, in which the sheet S is conveyed in the nipping portion NP, and with a moving direction, in which the belt 140 moves in the nipping portion NP.

The heater 110 has a recessed portion 113. The recessed portion 113 forms a recessed part of the heater 110, at which the heater 110 may contact the holder 120, and may restrict the heater 110 from moving in the lengthwise direction. The recessed portion 113 is located in a lengthwise end area in the heater 110 on one side, e.g., lower-leftward side in FIG. 3A, in the lengthwise direction and is formed to recess in the widthwise direction from one of edges of the heater 110 on widthwise ends.

In the present embodiment, the heater 110 is set in an arrangement such that the second face 112 faces the pressure roller 82. The heater 110 includes a base plate M, a first insulating layer G1, a second insulating layer G2, a heating pattern PH, a power-supply pattern PE, a power-supply terminal T, and a protective layer C.

The base plate M is an elongated planar plate made of metal such as stainless steel. The base plate M has a first face M1, which corresponds to the first face 111 of the heater 110, and a second face M2, which corresponds to the second face 112 of the heater 110. The base plate M includes a recessed portion M11, which forms a part of the recessed portion 113 in the heater 110. The base plate M is exposed outward at an edge face of the heater 110.

The first insulating layer G1, the second insulating layer G2, and the protective layer C shown in FIGS. 3A-3B are made of an insulating material such as glass. The first insulating layer G1 is formed on the first face M1 of the base plate M. The second insulating layer G2 is formed on the second face M2 of the base plate M.

On the second insulating layer G2, the heating pattern PH, the power-supply terminal T, and the power-supply pattern PE are formed. In other words, the heating pattern PH, the power-supply terminal T, and the power-supply pattern PE are arranged on the base plate M through the second insulating layer G2.

The heating pattern PH includes a resistance-heating element, which may generate heat by being powered. The heating pattern PH may be formed, for example, in a shape of U, which is elongated along the longer edges, i.e., edges at the widthwise ends, of the heater 110 and along a shorter edge, i.e., an edge at the other lengthwise end, on the other side opposite to the recessed portion 113 in the lengthwise direction.

The power-supply terminal T is a terminal to supply power to the heating pattern PH and includes two (2) power-supply terminals T, which are arranged in the lengthwise end area on the one side, i.e., the same side as the recessed portion 113, in the lengthwise direction. The power-supply terminals T have a same shape and align in the lengthwise direction at a widthwise central area in the heater 110. The power-supply terminals T are conductive to the heating pattern PH through the power-supply pattern PE. The power-supply terminals T are connectable with a connector 200 (see FIG. 4B) to be connected with a power source, which is not shown but is stowed inside the casing 2. In the following description, one of the power-supply terminals T located farther from the heating pattern PH may be called as a first power-supply terminal T1, and the other of the power-supply terminals T located closer to the heating pattern PH may be called as a second power-supply terminal T2.

The power-supply pattern PE is a pattern to connect the power-supply terminals T with the heating pattern PH electrically. The power-supply pattern PE includes a first power-supply pattern PEL which connects the first power-supply terminal T1 with the heating pattern PH, and a second power-supply pattern PE2, which connects the second power-supply terminal T2 with the heating pattern PH. The power-supply patterns PE and the power-supply terminals T are made of a material, of which resistance value in conductivity is lower than that of the heating pattern PH.

The protective layer C is arranged to cover the power-supply patterns PE and the heating pattern PH and expose the power-supply terminals T outward.

Figures 4A, 4B:
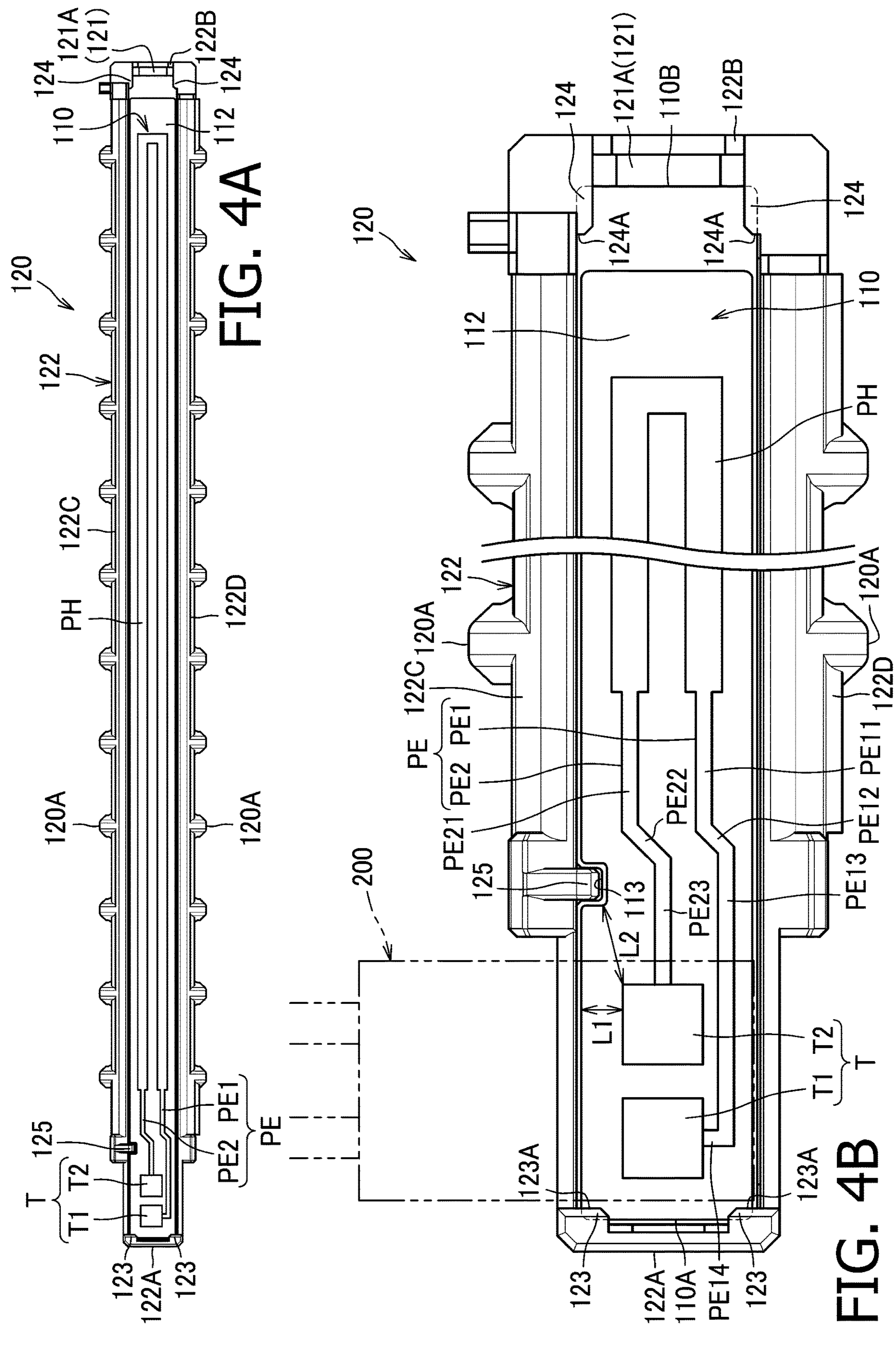
FIG. 4A is a plan view of a holder to hold the heater in the fuser according to the embodiment of the present disclosure.
FIG. 4B is an enlarged view of lengthwise end areas in the holder in the fuser according to the embodiment of the present disclosure.

As shown in FIGS. 4A-4B, the recessed portion 113 is located between the heating pattern PH and the second power-supply terminal T2 in the lengthwise direction. A distance between the recessed portion 113 and the second power-supply terminal T2 in the lengthwise direction is shorter than a distance between the recessed portion 113 and the heating pattern PH. In other words, the recessed portion 113 is located to be closer than the heating pattern PH to the second power-supply terminal T2. Moreover, the recessed portion 113 is located between the connector 200, which will be described further below, and the heating pattern PH in the lengthwise direction.

A distance L1 between the power-supply terminal T and an edge face of the heater 110 is longer than or equal to a minimum insulating distance, by which discharge between the power-supply terminal T and the base plate M exposed at the edge face of the heater 110 may be prevented. In other words, the distance L1 may be as short as the minimum insulating distance. With the distance L1 as short as the minimum insulating distance, the widthwise dimension of the heater 110 may be reduced. A shortest distance L2 between the power-supply terminal T and the recessed portion 113 is longer than the distance L1 and therefore longer than the minimum insulating distance. Thus, the discharge between the power-supply terminal T and the edge face of the base plate M exposed at the recessed portion 113 may be restrained.

The first power-supply pattern PE1 includes a first pattern PE11, a second pattern PE12, a third pattern PE13, and a fourth pattern PE14. The first pattern PE11 extends from the heating pattern PH to a position between the heating pattern PH and the recessed portions 113, M11 along the lengthwise direction. The second pattern PE12 extends from an end of the first pattern PE11 closer to the power-supply terminal T in a direction to deflect away from the edge of the heater 110 at the widthwise end on the one side, on which the recessed portions 113, M11 are formed. The second pattern PE12 inclines with respect to the lengthwise direction. The third pattern PE13 extends from an end of the second pattern PE12 closer to the power-supply terminal T along the lengthwise direction through an area between the second power-supply terminal T2 and the edge of the heater 110 at the widthwise end on the other side and is connected to the fourth pattern PE14. The fourth pattern PE14 extends from an end of the third pattern PE13 closer to the first power-supply terminal T1 to the first power-supply terminal T1 along the widthwise direction.

The second power-supply pattern PE2 includes a first pattern PE21, a second pattern PE22, and a third pattern PE23. The first pattern PE21 extends from the heating pattern PH to a position between the heating pattern PH and the recessed portions 113, M11 along the lengthwise direction. The second pattern PE22 extends from an end of the first pattern PE21 closer to the power-supply terminal T in a direction to deflect away from the edge of the heater 110 at the widthwise end on the one side, on which the recessed portions 113, M11 are located. The second pattern PE22 inclines with respect to the lengthwise direction. The third pattern PE23 extends from an end of the second pattern PE22 closer to the power-supply terminal T along the lengthwise direction to the second power-supply terminal T2.

Figure 6:
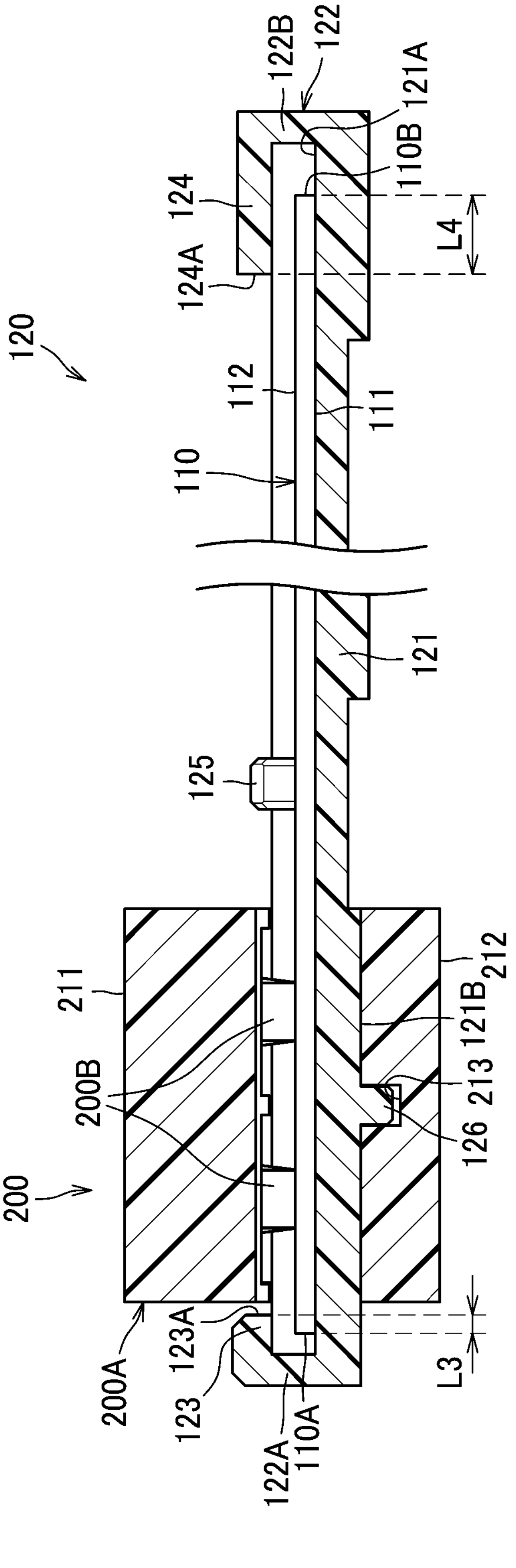
FIG. 6 is an enlarged cross-sectional view of the lengthwise end areas in the holder holding the heater, in one of which a connector nips the heater and the holder, according to the embodiment of the present disclosure.

Next, configuration of the holder 120 will be described below in detail. As shown in FIGS. 4A-4B and 6, the holder 120 includes a supporting base 121, a side wall 122, a first contact portion 123, a second contact portion 124, a projecting portion 125, and a protrusion 126.

The supporting base 121 includes a supporting face 121A to support the heater 110. The supporting face 121A may contact the first face 111 of the heater 110.

The side wall 122 protruding from the supporting face 121A is arranged along a periphery of the supporting base 121. The side wall 122 includes a first side wall 122A, a second side wall 122B, a third side wall 122C, and a fourth side wall 122D. The first side wall 122A is located at an end of the supporting base 121 on the one side in the lengthwise direction and extends along the widthwise direction. The second side wall 122B is located at an end of the supporting base 121 on the other side opposite to the one side in the lengthwise direction and extends along the widthwise direction. For example, in FIGS. 4A-4B, the first side wall 122A and the second side wall 122B are located on a leftward end and a rightward end, respectively, of the supporting base 121. The third side wall 122C is located at an end of the supporting base 121 at one end on one side in the widthwise direction and extends along the lengthwise direction. The fourth side wall 122D is located at an end of the supporting base 121 on the other side in the widthwise direction and extends along the lengthwise direction. For example, in FIGS. 4A-4B, the third side wall 122C and the fourth side wall 122D are located on an upper end and a lower end, respectively, of the supporting base 121.

The first contact portion 123 protrudes from the first side wall 122A in the lengthwise direction toward the second side wall 122B and may contact the second face 112 of the heater 110. In other words, the first contact portion 123 faces the second face 112 of the heater 110 along a direction orthogonal to the first face 111 and the second face 112 of the heater 110. In the following description, the direction orthogonal to the first face 111 of the heater 110 may be called as the orthogonal direction. The first contact portion 123 may contact the second face 112 of the heater 110 for an amount of a first distance L3 in the lengthwise direction. The first distance L3 is a distance in the lengthwise direction between an edge face 123A of the first contact portion 123 and an edge face 110A of the heater 110. In particular, the edge face 123A is one of edge faces of the first contact portion 123 facing toward the second side wall 122B, and the edge face 110A is one of edge faces 110A, 110B at lengthwise ends of the heater 110 closer to the first contact portion 123 in the lengthwise direction.

The second contact portion 124 is located apart from the first contact portion 123 in the lengthwise direction. The second contact portion 124 protrudes from the second side wall 122B toward the first contact portion 123 and may contact the second face 112 of the heater 110. In other words, the second contact portion 124 faces the second face 112 of the heater 110 along the orthogonal direction. The second contact portion 124 may contact the second face 112 of the heater 110 for an amount of a second distance L4 in the lengthwise direction. The second distance L4 is a distance in the lengthwise direction between and edge face 124A of the second contact portion 124 and the edge face 110B of the heater 110. In particular, the edge face 124A is one of edge faces of the second contact portion 124 facing toward the first contact portion 123, and the edge face 110B is the other one of the edge faces 110A, 110B at the lengthwise ends of the heater 110 closer to the second contact portion 124 in the lengthwise direction.

The first distance L3 is shorter than the second distance L4. In other words, in a view along the orthogonal direction, a dimension of an overlapping margin of the first contact portion 123 that overlaps the heater 110 is smaller than a dimension of an overlapping margin of the second contact portion 124 that overlaps the heater 110.

As shown in FIGS. 4A-4B, the holder 120 has two (2) first contact portions 123, each of which overlaps a corner of the heater 110 at the end on the one side in the lengthwise direction. Moreover, the holder 120 has two (2) second contact portions 124, each of which overlaps a corner of the heater 110 at the end on the other side in the lengthwise direction.

The holder 120 is a piece elongated in the lengthwise direction. The holder 120 is formed to be substantially larger than the heater 110 in a view along the orthogonal direction and surrounds a periphery of the heater 110 by the side wall 122 to hold the heater 110. The holder 120 has the guide face 120A, which may contact the inner circumferential surface 141 of the belt 140 as mentioned earlier, at each end thereof in the widthwise direction.

The projecting portion 125 extends from the third side wall 122C in the widthwise direction toward the fourth side wall 122D. The projecting portion 125 is arranged to fit in the recessed portion 113 in the heater 110. The projecting portion 125 may contact the recessed portion 113 in the heater 110 in the lengthwise direction and restrict the heater 110 from moving in the lengthwise direction.

The projecting portion 125 is located at an end area in the holder 120 in the lengthwise direction on the same one side as the first contact portion 123. In other words, a distance between the projecting portion 125 and the first contact portion 123 in the lengthwise direction is shorter than a distance between the projecting portion 125 and the second contact portion 124 in the lengthwise direction.

Figure 5:
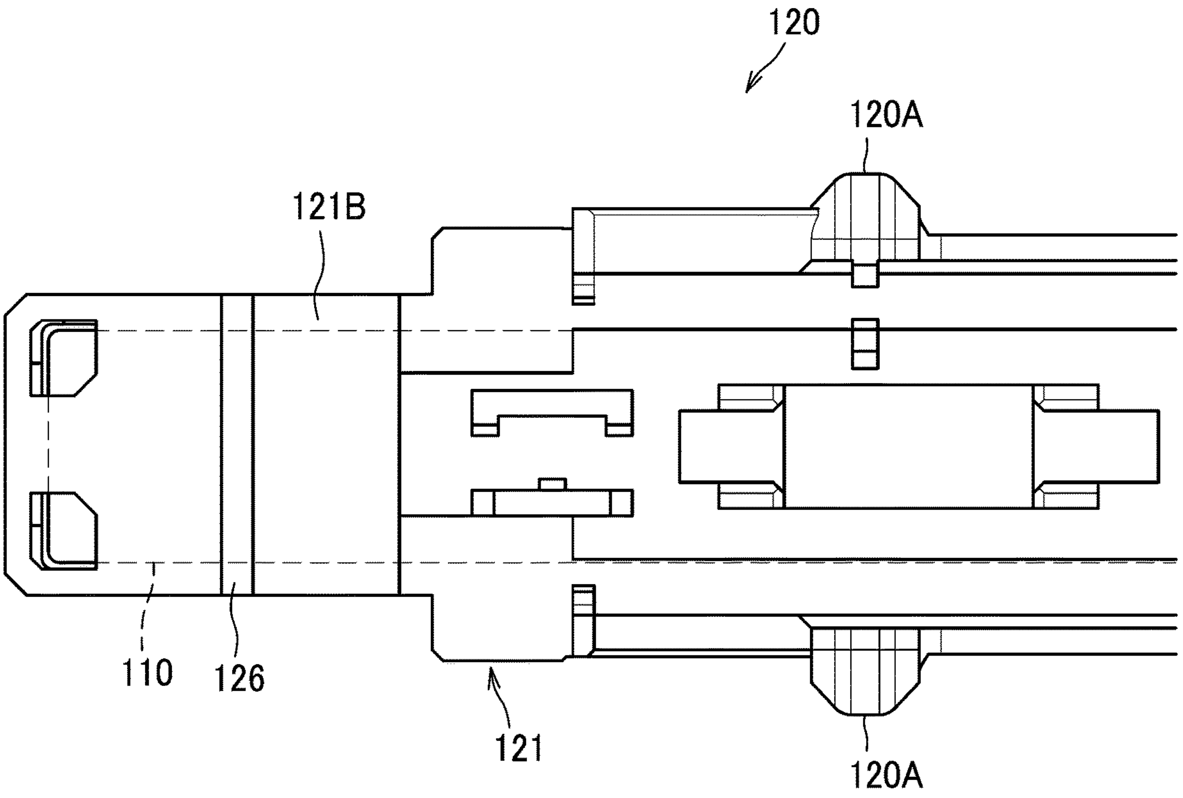
FIG. 5 is a partial view of an upper side of the holder holding the heater in the fuser according to the embodiment of the present disclosure.
Figure 7:
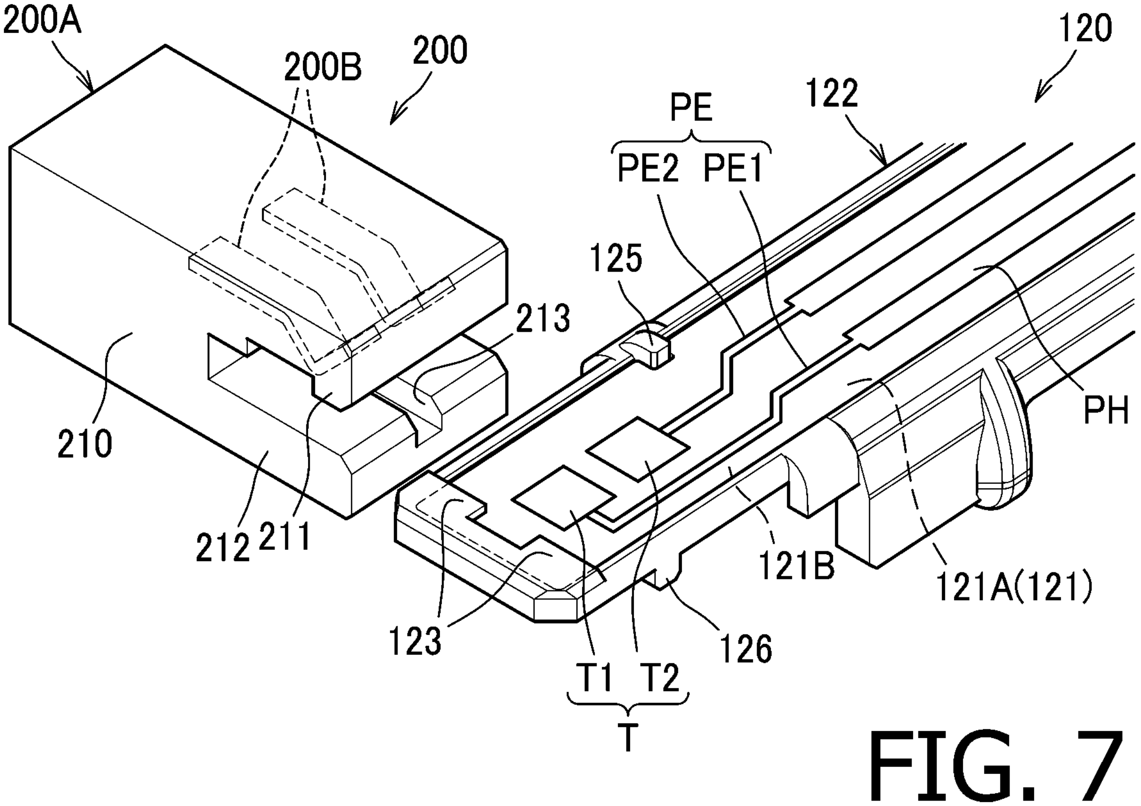
FIG. 7 is an exploded view of the holder holding the heater, from which the connector is detached, according to the embodiment of the present disclosure.

As shown in FIGS. 6-7, the protrusion 126 protrudes at an end area of the holder 120 on the one side in the lengthwise direction from a face 121B of the supporting base 121 on a side opposite to the supporting face 121A. The protrusion 126 is located at an approximately central position in the lengthwise direction within a lengthwise range of the connector 200, which will be described later in detail, to extend in the widthwise direction (see FIG. 5).

Next, the configuration of the connector 200 will be described below in detail. The connector 200 may serve to deliver power to the heater 110. Moreover, the connector 200 may serve to fasten a part of the heater 110 to the holder 120. The connector 200 is attached to the end area in the heater 100 on the one side in the lengthwise direction, on the one side in the widthwise direction. The connector 200 includes a connector body 200A, which may be made of, for example, resin, and two (2) electrodes 200B, which may be made of a conductive material such as metal.

Each of the electrodes 200B is connected to one of the power-supply terminals T in the heater 110. The electrodes 200B are spaced apart from each other and align in the lengthwise direction. The electrodes 200B are connected to the power source through wires, which are not shown.

The connector body 200A includes a base portion 210 having a rectangular shape, a first extended portion 211 and a second extended portion 212, which extend from the base portion 210 to the heater 110. The first extended portion 211 and the second extended portion 212 are spaced apart from each other and align in the orthogonal direction. The first extended portion 211 and the second extended portion 212 may nip the heater 110 and the holder 120 in the orthogonal direction.

On a surface of the second extended portion 212 that faces toward the first extended portion 211, a groove 213 is formed. The groove 213 may receive the protrusion 126 to contact and engage with the protrusion 126 in the lengthwise direction and restrict the connector 200 from moving in the lengthwise direction with respect to the holder 120.

The connector 200 may be located between the first contact portion 123 and the projecting portion 125 in the lengthwise direction. In this regard, a distance between the connector 200 and the first contact portion 123 in the lengthwise direction is shorter than a distance between the connector 200 and the second contact portion 124 in the lengthwise direction.

Next, benefits achievable from the fuser 8 according to the present embodiment will be described below.

When the fuser 8 is being assembled, first, the heater 110 may be attached to the holder 120. In particular, the lengthwise end of the heater 110 on the other side in the lengthwise direction may be inserted between the second contact portion 124 and the supporting base 121, and the heater 110 may be bowed in the lengthwise direction; further, the lengthwise end of the heater 110 on the one side in the lengthwise direction may be inserted between the first contact portion 123 and the supporting base 121. Thus, the heater 110 may be attached to the holder 120 easily. Meanwhile, the recessed portion 113 in the heater 110 may fit with the projecting portion 125 in the holder 120.

Next, the holder 120 may be installed in the heater unit 81. In particular, the holder 120 may be in a downward posture such that the second face 112 of the heater 110 faces toward the pressure roller 82, as shown in FIG. 2. Therefore, while the heater 110 may contact the first and second contact portions 123, 124 at the lengthwise ends thereof, the heater 110 may bow in the orthogonal direction at a lengthwise central area bulging downward. Meanwhile, the recessed portion 113 in the heater 110 and the projecting portion 125 in the holder 120 are located at the position closer to the first contact portion 123 than the second contact portion 124 in the lengthwise direction. Therefore, while the overlapping margins may decrease at the lengthwise ends of the heater 110, the overlapping margin at the lengthwise end of the heater 110 that overlaps the first contact portion 123 on the one side in the lengthwise direction may decrease to a smaller extent than the overlapping margin at the lengthwise end of the heater 110 that overlaps the second contact portion 124 on the other side in the lengthwise direction. In this arrangement, although the overlapping margin of the heater 110 that overlaps the first contact portion 123 may be smaller than the overlapping margin of the heater 110 that overlaps the second contact portion 124, the heater 110 may be securely held by the holder 120.

In order to print an image on the sheet S, when the heater 110 is powered, the power may be delivered to the heating pattern PH through the power-supply terminal T and the power-supply pattern PE, and the heating pattern PH may generate heat. Therefore, due to the heat from the heating pattern PH, the heater 110 and the holder 120 may thermally expand in the lengthwise direction. A linear expansion coefficient of the holder 120, which may be made of resin, is greater than a linear expansion coefficient of the heater 110, which may be made of metal. Meanwhile, a thermal conductivity coefficient of the heater 110 is greater than a thermal conductivity coefficient of the holder 120, and the heater 110 has the heating pattern PH; therefore, a temperature in the heater 110 may increase more easily than the holder 110. Due to these factors, a difference is caused in the thermal expansion amount between the holder 120 and the heater 110; therefore, the connector 200 and the power-supply terminal T in the heater 110, of which positions may depend on the conditions of the holder 120, may be displaced from each other in the lengthwise direction. In this regard, the heater 110 of the present embodiment has the recessed portion 113, which is located in proximity to the power-supply terminal T; therefore, an amount of the displacement between the position of the power-supply terminal T and the position of the connector 200 with reference to the projecting portion 125 may be restrained to be smaller.

Thus, according to the embodiment described above, benefits described below may be achievable.

The connector 200 may be placed at a predetermined position with respect to the heater 110 through the holder 120; therefore, the connector 200 may be restrained from being displaced from the heater 110 in the lengthwise direction. Meanwhile, the recessed portion 113 in the heater 110 is located at the position apart from the power-supply terminal T in the lengthwise direction. With this arrangement of the recessed portion 113, a substantial insulating distance may be secured between the edge face of the base plate M exposed in the recessed portion 113 and the power-supply terminal T, and the dimension of the heater 110 in the widthwise direction may be reduced. Thus, a manufacturing cost may be restrained from increasing, and the heat conductivity of the heater 110 may be improved.

Moreover, with the recessed portion 113 arranged between the connector 200 and the heating pattern PH in the lengthwise direction, the recessed portion 113 may be separated farther apart from the power-supply terminal T, and the insulating distance may be secured more reliably.

Moreover, the distance between the recessed portion 113 and the second power-supply terminal T2 is shorter than the distance between the recessed portion 113 and the heating pattern PH. Thus, the projecting portion 125 in the holder 120, which may contact the recessed portion 113, may be located in proximity to the part of the holder 120, which may contact to engage with the connector 200, i.e., the groove 213. Therefore, the connector 200 may be restrained from being displaced from the heater 110 in the lengthwise direction effectively.

Moreover, the power-supply terminals T, formed in the same size and the same shape, are located at the widthwise central area in the heater 110. Therefore, the substantial insulating distance between each power-supply terminal T and each edge face of the base plate M in the widthwise direction may be secured easily, and the power-supply terminals T may be efficiently arranged in the positions that may help minimizing the dimension of the heater 110 in the widthwise direction.

Moreover, with the protrusion 126 arranged in the holder 120 and the groove 213 formed in the connector 200, rigidity of the holder 120 may be improved compared to a holder, in which a groove rather than the protrusion 126 is formed.

Moreover, the distance between the connector 200 and the first contact portion 123 in the lengthwise direction is shorter than the distance between the connector 200 and the second contact portion 124 in the lengthwise direction. Therefore, with use of a nipping force from the connector 200, the heater 100 may be securely held by the holder 120 at the position closer to the first contact portion 123.

Moreover, with the connector 200 located between the first contact part 123 and the projecting portion 125 in the lengthwise direction, the nipping force from the connector 200 may be effectively used to hold the heater 100 securely on the holder 120 at the position closer to the first contact portion 123.

Although an example of carrying out the invention have been described, those skilled in the art will appreciate that there are numerous variations and permutations of the fuser that fall within the spirit and scope of the disclosure as set forth in the appended claims. It is to be understood that the subject matter defined in the appended claims is not necessarily limited to the specific features or act described above. Rather, the specific features and acts described above are disclosed as example forms of implementing the claims.

For example, the heater 110 may not necessarily be attached to the holder 120 by the first and second contact portions 123, 124 but may be attached by the second contact portion 124 alone. Without the first contact portion 123, the heater 110 may still be held on the holder 120 by the second contact portion 124 and the connector 200, which is spaced apart from the second contact portion 124 in the lengthwise direction to fix the heater 110 onto the holder 120. Optionally or additionally, the heater 110 may be fixed to the holder 120 by an adhesive agent. With the adhesive agent fixing the heater 110 to the holder 120, the second contact portion 124 may be the sole part that may be handled by the user to attach the heater 110 to the holder 120. Therefore, the heater 110 may be attached to the holder 120 more easily.

For another example, the recessed portion 113 and the projecting portion 125 may not necessarily be formed in the heater 110 and the holder 120, respectively, but the projecting portion may be formed in the heater 110 while the recessed portion may be formed in the holder 120.

For another example, the protrusion 126 and the groove 213 may not necessarily be formed in the holder 120 and the connector 200, respectively, but the protrusion may be formed in the connector 200 while the groove may be formed in the holder 120.

For another example, a quantity of the first contact portions 123 or the second contact portions 124 may not necessarily be limited to two (2) but may be one (1), three (3), or more. For another example, the first and second contact portions 123, 124 may not necessarily be arranged on the corners of the heater 10 as long as the first and second contact portions 123, 124 are arranged on at least a part of the heater 110 to extend in the widthwise direction. For another example, the first and second contact portions 123, 124 may not necessarily be formed to extend in the lengthwise direction from the first and second side walls 122A, 122B, respectively, but may be formed apart from the first and second side walls 122A, 122B to extend from the third side wall 122C and the fourth side wall 122D in the widthwise direction.

For another example, the side wall 122 may not necessarily be formed continuously along the periphery of the supporting base 121 but may be formed intermittently along the periphery of the supporting base 121. For another example, the side wall 122 may include a plurality of side walls that are arranged to be spaced apart from one another. In this arrangement, the holder 120 may still hold the heater 110. For another example, in the above-mentioned arrangement, in which the first and second contact portions 123, 124 extend from the third side wall 122C and the fourth side wall 122D, the first and second side walls 122A, 122B may be omitted.

For another example, one or more elements in the embodiment and the examples described above may be optionally combined.

What is claimed is:

1. A fuser comprising:

a heater in a form of a planar plate, the heater having a first face and a second face opposite to the first face, the heater having shorter edges extending in a widthwise direction and longer edges extending in a lengthwise direction, the lengthwise direction being a direction that intersects the shorter edges, and the longer edges being longer than the shorter edges; and a holder supporting the heater, the holder having a supporting base supporting the first face of the heater, a side wall protruding from the supporting base, a first contact portion located in an end area on one side in the lengthwise direction of the holder, the first contact portion protruding from the side wall and facing the second face of the heater in a direction orthogonal to the second face of the heater, and a second contact portion located apart from the first contact portion in the lengthwise direction in an end area on the other side of the holder in the lengthwise direction, the second contact portion protruding from the side wall and facing the second face of the heater in a direction orthogonal to the second face of the heater.

2. The fuser according to claim 1, wherein a distance between an edge face of the first contact portion facing toward the second contact portion and one of the shorter edges closer to the first contact portion in the lengthwise direction is shorter than a distance between an edge face of the second contact portion facing toward the first contact portion and another one of the shorter edges of the heater closer to the second contact portion in the lengthwise direction.

3. The fuser according to claim 2, wherein a recessed portion is formed in one of the heater and the holder, and a projecting portion engageable with the recessed portion is formed in the other of the heater and the holder, and wherein a distance between the projecting portion and the first contact portion in the lengthwise direction is shorter than a distance between the projecting portion and the second contact portion in the lengthwise direction.

4. The fuser according to claim 3, wherein the recessed portion is faulted in the heater, and the projecting portion is formed in the holder.

5. The fuser according to claim 2, further comprising:

a connector configured to supply power to the heater, the connector being configured to nip the heater and the holder, wherein a distance between the connector and the first contact portion in the lengthwise direction is shorter than a distance between the connector and the second contact portion in the lengthwise direction.

6. The fuser according to claim 5, wherein a recessed portion is formed in one of the heater and the holder, and a projecting portion engageable with the recessed portion is formed in the other of the heater and the holder, and wherein the connector is located between the first contact portion and the projecting portion in the lengthwise direction.

7. The fuser according to claim 6, wherein the recessed portion is formed in the heater, and the projecting portion is formed in the holder.

8. The fuser according to claim 1, wherein the heater includes a metal-made base plate.

9. A fuser comprising:

a heater in a form of a planar plate, the heater having a first face and a second face opposite to the first face, the heater having shorter edges extending in a widthwise direction and longer edges extending in a lengthwise direction, the lengthwise direction being a direction that intersects the shorter edges, the longer edges being longer than the shorter edges;

a holder supporting the heater;

a first extended portion; and a second extended portion configured to nip the heater and the holder between the first extended portion and the second extended portion, wherein the holder has a supporting base supporting the first face of the heater, a side wall protruding from the supporting base, the side wall being located at one end of the holder in the lengthwise direction, and a contact portion located apart from the first extended portion and the second extended portion in the lengthwise direction of the heater, the contact portion protruding from the side wall toward the other end of the holder in the lengthwise direction and facing the second face of the heater in a direction orthogonal to the second face of the heater.

10. The fuser according to claim 9, wherein the first extended portion and the second extended portion form a connector configured to supply power to the heater, the connector being configured to nip the heater and the holder.

11. The fuser according to claim 10, wherein a recessed portion is formed in one of the heater and the holder, and a projecting portion engageable with the recessed portion is formed in the other of the heater and the holder, and wherein a distance between the connector and the recessed portion in the lengthwise direction is shorter than a distance between the projecting portion and the contact portion in the lengthwise direction.

12. The fuser according to claim 11, wherein the recessed portion is formed in the heater, and the projecting portion is formed in the holder.

13. The fuser according to claim 9, wherein the heater includes a metal-made base plate.

* * * * *